UNITED STATES PATENT OFFICE 2,507,147

ACYLOXYVINYL ALKYL SULFONES AND POLYMERS THEREOF

Joseph B. Dickey and Harry W. Coover, Jr., Rochester, N. Y., assignors to Eastman Kodak Company, Rochester, N. Y., a corporation of New Jersey No Drawing. Application December 29, 1948, Serial No. 68,055

12 Claims. (Cl. 260—79.3)

This invention relates to vinyl alkyl sulfones which are substituted in the vinyl group with an acyloxy group, polymers thereof, and to methods for preparing the same.

The new compounds of our invention may be represented by the general formula:

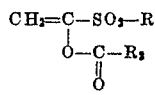

and

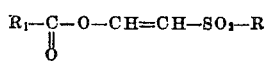

wherein R represents an alkyl group of the series $C_nH_{2n+1}$ (e. g. methyl, ethyl, propyl, butyl, amyl, dodecyl, etc.), an aryl group (e. g. phenyl), an aralkyl group (e. g. benzyl) and $R_1$ and $R_2$ each represents an alkyl group of the series $C_nH_{2n+1}$ as defined above and a phenyl group.

The compounds of the invention are valuable intermediates for the preparation of other useful organic compounds. They are also polymerizable alone or conjointly with other unsaturated organic compounds to resinous polymers which are useful for the preparation of waterproofing compositions, films, sheets, fibers, and the like. They can also be molded and worked mechanically to the finished form by the usual methods of milling, sawing, boring, etc.

In accordance with the invention the new acyloxy vinyl alkyl sulfones may be prepared by treating the desired vinyl alkyl sulfone with hypochlorous acid to obtain a mixture of α-chloro-β-hydroxyethyl alkyl sulfone and α-hydroxy-β-chloroethyl alkyl sulfone, acylating the mixture with an organic acid anhydride or an organic acid halide to obtain a mixed product of α-chloro-β-acyloxyethyl alkylsulfone and α-acyloxy-β-chloroethyl alkyl sulfone, separating the individual products from one another by fractional distillation under reduced pressure, and then dehydrohalogenating the isolated (acyloxy-chloro-) ethyl alkyl sulfones by heating with an organic base such as quinoline, pyridine, triethylamine, tributylamine, etc., to obtain the respective acyloxy vinyl alkyl sulfones in good yield. The vinyl alkyl sulfone starting materials can be prepared by known methods such as described in British Patent No. 442,524. The organic acid anhydride can be acetic anhydride, propionic anhydride, butyric anhydride, isobutyric anhydride, valeric anhydride, lauric anhydride, stearic anhydride, etc. The organic acid halide can be acetyl chloride, propionyl chloride, butyryl chloride, isobutyryl chloride, valeryl chloride, lauroyl chloride, stearyl chloride, etc. Further details of the process for obtaining the new compounds of the invention are given in the examples.

The polymerization of the new acyloxyvinyl alkyl sulfones of our invention alone or conjointly with one or more other unsaturated compounds is accelerated by heat and by polymerization of vinyl and other unsaturated organic compounds. Exemplary of such catalysts are the organic peroxides (e. g. benzoyl peroxide, acetyl peroxide, lauroyl peroxide, etc.), hydrogen peroxide, perborates (e. g. alkali metal perborates), persulfates (e. g. alkali metal persulfates) and ionic polymerization catalysts (e. g. boron trifluoride). The polymerization can be effected in mass or in the presence of an inert diluent (e. g. water, acetic acid, 1,4-dioxane, acetonitrile, etc.). However, the monomers can also be emulsified in a liquid in which they are insoluble (e. g. in water) and the emulsion then subjected to polymerization. The monomers can also be suspended in water using a relatively poor dispersing agent (e. g. starch) and polymerized in granular form. The monomers can also be polymerized as above described with one or more copolymerizable unsaturated organic compounds, for example, with vinyl compounds (i. e. compounds containing the basic $CH_2=C<$ group) such as vinyl acetate, vinyl propionate, vinyl butyrate, vinyl propionate, vinyl butyrate, vinyl trifluoroacetate, methyl acrylate, methyl methacrylate, styrene, ortho-acetamino styrene, α-methylstyrene, 2,4 - dichloro - α - methylstyrene, acrylonitrile, α - methacrylonitrile, α - acetoxyacrylonitrile, α-acetoxy methacrylate, vinyl chloride, vinyl fluoride, vinylidene dichloride, vinylidene chloride-fluoride, vinyl methylketone, trifluoromethyl vinylketone, vinylmethylether, vinyl-ω-trifluoroethyl ether, vinylmethylsulfone, vinyl sulfonamide, trans-β-cyano- and carboxamidomethyl acrylate, vinylmethylurethane, acrylamide, acrylic acid ethylamide, vinyl phthalimide, vinyl succinimide, acrylic acid, vinyl naphthalene, isobutylene, ethylene, butadiene, α-acetoxybutadiene-1,3, and with other unsaturated organic compounds such as maleic anhydride, methyl maleate, methyl fumarate, and the like.

The copolymers of the invention may contain variable amounts of each commoner and are obtained with starting polymerization mixtures having from 5 to 95 molecular proportions of the new unsaturates and from 95 to 5 molecular proportions of the above-mentioned other unsaturated organic compounds. However, the preferred copolymers contain from 10 to 90 molecular proportions of the new acetoxyvinyl alkyl sulfones and from 90 to 10 molecular proportions of the other unsaturated comonomers although in the case of copolymers with acrylonitrile and substituted acrylonitriles, the best ratios are from 5 to 40 molecular proportions of the α-acyloxyvinyl alkyl sulfones to from 95 to 60 molecular proportions of the acrylonitrile compound. The temperature of polymerization at normal pressures may be varied from 30° C. to 120° C., preferably from 30° to 75° C. although in cases where high pressure is employed the temperature may be as high as 200° C., and where an ionic catalyst such as boron trifluoride is employed the temperature may be as low as —75° C. and still give satisfactory resinous polymers. Where the polymerization is carried out in an inert solvent medium such as previously mentioned, the concentration of the monomers to be polymerized can be varied from 1 to 25 per cent of the weight of the solvent employed.

The following examples will serve to illustrate our new unsaturates, polymers thereof, and the manner of preparing the same.

*Example 1.—Preparation of α-hydroxy-β-chloroethyl methyl sulfone and α-chloro-β-hydroxythyl methyl sulfone*

100 grams of vinyl methyl sulfone were slowly added to a water solution containing 53 grams of hypochlorous acid with stirring. The reaction temperature was maintained below 20° C. After the addition of vinyl methyl sulfone was completed, the reaction mixture was tested from time to time with sodium iodide, until no further test for hypochlorous acid was observed. The mixture of chlorohydroxyethyl methyl sulfones was then extracted from the reaction mixture with benzene. Distillation of the benzene left as a residue a crude mixture of α-chloro-β-hydroxyethyl methyl sulfone

and α-hydroxy-β-chloroethyl methyl sulfone

amounting together to a yield of about 90 per cent of calculated.

*Example 2.—Preparation of α-acetoxy-β-chloroethyl methyl sulfone and α-chloro-β-acetoxyethyl methyl sulfone*

127 grams of the crude mixture of chlorohydroxyethyl methyl sulfones prepared as described in Example 1, was heated on a steam bath for several hours with 200 grams of acetic anhydride. When the reaction was complete, the acetic acid which formed and the excess of acetic anhydride were removed by distillation. The residue was then subjected to fractional distillation under reduced pressure, the α-acetoxy-β-chloro- and α-chloro-β-acetoxyethyl methyl sulfones being obtained as pure compounds.

*Example 3.—α-acetoxyvinyl methyl sulfone*

A mixture of 17 grams of α-acetoxy-β-chloroethyl methyl sulfone and 25 grams of freshly distilled synthetic quinoline was heated at 100° to 150° C. for a period of 5 to 6 hours. Fractionation of the reaction mixture under reduced pressure gave as a product a yield of about 70 per cent of pure α-acetoxyvinyl methyl sulfone

For the preparation of other α-acyloxyvinyl alkyl sulfones where the alkyl group is ethyl, propyl, isopropyl, isobutyl, sec. butyl, tertiary butyl, etc., the corresponding vinyl alkyl sulfone is treated with hypochlorous acid, acylated, the α-acetoxy-β-chloroethyl methyl sulfone obtained is separated from the mixture and dehydrohalogenated, following the general procedures described in the preceding examples. Thus, with acetic anhydride or acetyl chloride, there were obtained α-acetoxyvinyl ethyl sulfone, α-acetoxyvinyl propyl sulfone, α-acetoxyvinyl isopropyl sulfone, α-acetoxyvinyl butyl sulfone, α-acetoxyvinyl isobutyl sulfone, α-acetoxyvinyl sec.-butyl sulfone, α-acetoxyvinyl tert. butyl sulfone, with propionic anhydride or propionyl chloride as the acylating agent, α-propionoxyvinyl methyl sulfone, α-propionoxyvinyl ethyl sulfone, α-propionoxyvinyl propyl sulfone, α-propionoxyvinyl isopropyl sulfone, α-propionoxyvinyl butyl sulfone, α-propionoxyvinyl isobutyl sulfone, α-propionoxyvinyl sec.-butyl sulfone, α-propionoxyvinyl tert.-butyl sulfone, etc., with butyric anhydric or butyryl chloride as the acylating agent, α-butyryloxyvinyl methyl sulfone, α-butyryloxyvinyl ethyl sulfone, α-butyryloxyvinyl propyl sulfone, α-butyryloxyvinyl isopropyl sulfone, α-butyryloxyvinyl butyl sulfone, α-butyryloxyvinyl isobutyl sulfone, α-butyryloxyvinyl sec.-butyl sulfone, α-butyryloxyvinyl tert.-butyl sulfone, etc., and with isobutyric anhydride or isobutyryl chloride as the acylating agent, α-isobutyryloxyvinyl methyl sulfone, α-isobutyryloxyvinyl ethyl sulfone, α-isobutyryloxyvinyl propyl sulfone, α-isobutyryloxyvinyl isopropyl sulfone, α-isobutyryloxyvinyl butyl sulfone, α-isobutyryloxyvinyl isobutyl sulfone, α-isobutyryloxyvinyl sec.-butyl sulfone, α-isobutyryloxyvinyl tert.-butyl sulfone, etc.

*Example 4.—Poly-α-acetoxyvinyl methyl sulfone*

10 grams of α-acetoxyvinyl methyl sulfone and 0.1 gram of benzoyl peroxide were sealed in a tube and heated at 80° C. for a period of 24 hours. At the end of this time, the sulfone compound had polymerized to a clear, hard, readily moldable polymer. Similar kinds of resinous polymers were also obtained by substituting for the α-acetoxyvinyl methyl sulfone in the above example an equivalent amount of α-acetoxyvinyl ethyl sulfone or α-propionoxyvinyl methyl sulfone.

*Example 5.—Copolymer of α-acetoxyvinyl methyl sulfone and methyl methacrylate*

A mixture of 5 grams of α-acetoxyvinyl methyl sulfone, 5 grams of methyl methacrylate and 0.1 gram of benzoyl peroxide was heated in a sealed tube at 80° C. for a period of 24 hours. At the end of this time, the material in the tube had all polymerized to a clear, hard polymer. In place of methyl methacrylate, there can be substituted 5 grams of styrene to give a similar clear, hard copolymer of α-acetoxyvinyl methyl sulfone and styrene.

*Example 6.—Copolymer of α-acetoxyvinyl ethyl sulfone and acrylonitrile*

A mixture of 8 grams of acrylonitrile, 2 grams of α-acetoxyvinyl ethyl sulfone, 50 grams of acetonitrile and 0.2 grams of acetyl peroxide was heated at 60° C. for a period of 24 hours. The copolymer which formed as a precipitate in the solution of acetonitrile was filtered out and dried. The yield of copolymer was soluble in dimethyl formamide, solutions of which were spinnable into tough fibers. In place of the α-acetoxyvinyl ethyl sulfone in the above example, there can be substituted 2 grams of α-propionoxyvinyl methyl sulfone to give a similar resinous copolymer from which tough fibers can be prepared.

It will be understood that other equally valuable resinous copolymers of any of our new sulfones with other vinyl compounds such as those mentioned can be prepared with facility by employing the general procedures of the examples used for illustration.

What we claim and desire to secure by Letters Patent of the United States of America is:

1. A compound selected from the group consisting of an α-acyloxyvinyl alkyl sulfone and a β-acyloxyvinyl alkyl sulfone, wherein each acyloxy group is selected from those consisting of a saturated fatty acid acyloxy group containing from 1 to 18 carbon atoms and a benzoyloxy group.
2. An α-acyloxyvinyl alkyl sulfone wherein the acyloxy group is a saturated fatty acid acyloxy group containing from 1 to 18 carbon atoms.
3. An α-acetoxyvinyl alkyl sulfone.
4. α-acetoxyvinyl methyl sulfone.
5. An α-propionoxy alkyl sulfone.
6. α-propionoxy methyl sulfone.
7. α-acetoxyvinyl ethyl sulfone.
8. A polymer of a compound selected from the group consisting of an α-acyloxyvinyl alkyl sulfone and a β-acyloxyvinyl alkyl sulfone, wherein each acyloxy group is selected from those consisting of a saturated fatty acid acyloxy group containing from 1 to 18 carbon atoms and a benzoyloxy group.
9. A polymer of an α-acyloxyvinyl sulfone wherein the acyloxy group is a saturated fatty acid acyloxy group containing from 1 to 18 carbon atoms.
10. A copolymer of from 5 to 95 molecular proportions of α-acetoxyvinyl methyl sulfone and from 95 to 5 molecular proportions of methyl methacrylate.
11. A copolymer of from 5 to 40 molecular proportions of α-acetoxyvinyl ethyl sulfone and from 95 to 60 molecular proportions of acrylonitrile.
12. A copolymer of from 5 to 40 molecular proportions of α-propionoxyvinyl methyl sulfone and from 95 to 60 molecular proportions of acrylonitrile.

JOSEPH B. DICKEY.
HARRY W. COOVER, Jr.

REFERENCES CITED

The following references are of record in the file of this patent:

UNITED STATES PATENTS

| Number | Name | Date |
|---|---|---|
| 2,427,640 | Whitehill | Sept. 16, 1947 |